US012634269B2

(12) United States Patent
Rule et al.

(10) Patent No.: US 12,634,269 B2
(45) Date of Patent: May 19, 2026

(54) SYSTEMS AND METHODS FOR AUTHENTICATION OF COMMUNICATION PROCESSING SYSTEMS BASED ON USER PROFILE INFORMATION

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 230 days.

(21) Appl. No.: 18/633,228

(22) Filed: Apr. 11, 2024

(65) Prior Publication Data

US 2025/0323902 A1 Oct. 16, 2025

(51) Int. Cl.
| | |
|---|---|
| *H04L 9/40* | (2022.01) |
| *G06F 21/62* | (2013.01) |
| *H04L 9/08* | (2006.01) |

(52) U.S. Cl.
CPC .......... H04L 63/08 (2013.01); G06F 21/6218 (2013.01); H04L 9/0825 (2013.01)

(58) Field of Classification Search
CPC ..... H04L 63/08; H04L 9/0825; H04L 63/102; G06F 21/6218
See application file for complete search history.

(56) References Cited

U.S. PATENT DOCUMENTS

| | | | | |
|---|---|---|---|---|
| 10,158,727 B1* | 12/2018 | Mukhopadhyaya | .. | H04W 4/023 |
| 10,997,559 B1* | 5/2021 | Hoehnen | ............... | G06F 16/242 |
| 11,086,858 B1* | 8/2021 | Koukoumidis | ......... | H04L 67/75 |
| 11,218,487 B1* | 1/2022 | Iles | ......................... | G06N 20/00 |
| 11,562,027 B1* | 1/2023 | Ebenezer | ............ | G06F 11/3688 |
| 12,147,513 B1* | 11/2024 | Jain | .......................... | G06F 21/31 |
| 12,181,847 B1* | 12/2024 | Brett | ...................... | G06N 20/00 |
| 12,445,458 B1* | 10/2025 | Thompson | .......... | H04L 63/1433 |
| 12,493,659 B2* | 12/2025 | Chan | ...................... | G06F 16/955 |
| 2009/0187515 A1* | 7/2009 | Andrew | .............. | G06F 16/9535 |
| | | | | 707/E17.014 |
| 2011/0125783 A1* | 5/2011 | Whale | ................... | G06F 16/435 |
| | | | | 707/769 |
| 2011/0264665 A1* | 10/2011 | Mital | .................. | G06F 16/9535 |
| | | | | 707/769 |

(Continued)

*Primary Examiner* — Aravind K Moorthy

(74) *Attorney, Agent, or Firm* — Foley & Lardner LLP

(57) ABSTRACT

The systems and methods disclosed herein enable authentication of communication processing systems based on user profile information. The system may receive a network request associated with a user. The system may determine a subset of the user profile information corresponding to previous communications. The system may generate a plurality of queries that request parameters associated with the previous communications. The system may transmit the plurality of queries to the communication processing system. The system may receive a plurality of responses from the communication processing system. The system may determine an authentication status based on whether parameters of the plurality of responses match parameters associated with the previous communications. The system may transmit a communication request to an administrator system.

20 Claims, 7 Drawing Sheets

100

(56) References Cited

U.S. PATENT DOCUMENTS

| | | | | |
|---|---|---|---|---|
| 2014/0092413 A1* | 4/2014 | Shibata | H04N 1/00244 |
| | | | 358/1.13 |
| 2017/0103217 A1* | 4/2017 | Arasu | H04L 9/0819 |
| 2017/0236073 A1* | 8/2017 | Borisyuk | G06Q 50/01 |
| | | | 706/12 |
| 2019/0102553 A1* | 4/2019 | Herwadkar | G06N 20/00 |
| 2019/0163780 A1* | 5/2019 | Ozcaglar | G06F 16/9536 |
| 2019/0303379 A1* | 10/2019 | Waas | G06F 16/252 |
| 2020/0004835 A1* | 1/2020 | Ramanath | G06N 3/088 |
| 2020/0272664 A1* | 8/2020 | Aggour | G06N 5/00 |
| 2020/0311300 A1* | 10/2020 | Callcut | G06N 20/00 |
| 2021/0141791 A1* | 5/2021 | Nawathe | G06F 16/24575 |
| 2021/0185046 A1* | 6/2021 | Gupta | H04L 67/1095 |
| 2021/0374802 A1* | 12/2021 | Longo | G06F 16/2379 |
| 2021/0390098 A1* | 12/2021 | Reynolds | G06F 16/24535 |
| 2021/0390507 A1* | 12/2021 | Reynolds | G06F 16/212 |
| 2022/0067181 A1* | 3/2022 | Carley | G06F 18/217 |
| 2022/0067574 A1* | 3/2022 | Barnes | G06N 3/09 |
| 2022/0116422 A1* | 4/2022 | Davidson | G06F 21/6218 |
| 2023/0041097 A1* | 2/2023 | Winterstein | G06Q 30/0272 |
| 2023/0064961 A1* | 3/2023 | Mahindru | G06F 16/3344 |
| 2023/0359615 A1* | 11/2023 | Reynolds | G06F 16/252 |
| 2024/0126822 A1* | 4/2024 | Hamilton | G06F 16/9538 |
| 2024/0143659 A1* | 5/2024 | Zhang | G06F 16/9038 |
| 2024/0184789 A1* | 6/2024 | Pearman | G06F 16/24578 |
| 2024/0232729 A1* | 7/2024 | Bouvrie | G06N 20/00 |
| 2024/0296279 A1* | 9/2024 | Gardner | G06F 16/338 |
| 2024/0320231 A1* | 9/2024 | Bhattacharjee | G06F 9/5066 |
| 2024/0320523 A1* | 9/2024 | McColeman | G06N 5/04 |
| 2024/0330796 A1* | 10/2024 | Pandey | G06F 40/279 |
| 2024/0354321 A1* | 10/2024 | Kundel | G06F 16/3344 |
| 2024/0378306 A1* | 11/2024 | Lyle | G06F 21/6245 |
| 2024/0403872 A1* | 12/2024 | Jensen | G06Q 20/3265 |
| 2024/0411752 A1* | 12/2024 | Prabhakar | G06F 16/242 |
| 2025/0005050 A1* | 1/2025 | Krishnan | G06F 16/243 |
| 2025/0005063 A1* | 1/2025 | Kulshreshtha | G06F 40/169 |
| 2025/0021681 A1* | 1/2025 | Stout | G06F 21/6218 |
| 2025/0023901 A1* | 1/2025 | Ketharaju | H04L 63/1433 |
| 2025/0045311 A1* | 2/2025 | Johnson | G06F 40/205 |
| 2025/0045437 A1* | 2/2025 | Koshti | G06F 16/24578 |
| 2025/0053982 A1* | 2/2025 | Neighbour | H04W 12/06 |
| 2025/0190604 A1* | 6/2025 | Fu | G06F 16/242 |
| 2025/0193009 A1* | 6/2025 | Hatchue | H04L 9/0825 |
| 2025/0227155 A1* | 7/2025 | Greene | H04L 67/535 |
| 2025/0232351 A1* | 7/2025 | Tao | H04L 63/102 |
| 2025/0310336 A1* | 10/2025 | Medina | H04L 63/20 |

* cited by examiner

100

300

310

| Field 312 | Value 314 |
|---|---|
| Requested Resource | Resource A |
| Requested Resource Value | Resource Value 1 |
| User Identifier | Username 1 |

320

| Field 322 | Value 324 |
|---|---|
| Name | John Doe |
| Birth Date | 10/23/1980 |
| IP Address | 10.10.10.10 |
| Browser Language | French |
| Account Age | 7 years |
| Phone Number | 202-555-3241 |

| Communication Type 402 | Timestamp 404 | Value 406 |
|---|---|---|
| Type A | Timestamp 1 | Value 1 |
| Type B | Timestamp 2 | Value 2 |
| Type C | Timestamp 3 | Value 3 |
| Type A | Timestamp 4 | Value 4 |
| Type C | Timestamp 5 | Value 5 |
| Type D | Timestamp 6 | Value 6 |

410

| Query Identifier 412 | Requested Value 414 | Condition Argument 416 | Query Condition 418 | Query Condition Value 420 |
|---|---|---|---|---|
| 1 | Count | Timestamp | < | Timestamp 7 |
| 2 | Count | Timestamp | > | Timestamp 8 |
| 3 | Count | Communication Type | == | Type A |
| 4 | Count | Communication Type | == | Type C |
| 5 | Boolean Value | Value | < | Value 1 |
| 6 | Boolean Value | Value | == | Value 7 |

FIG. 4

| Query Identifier 502 | Expected Value 504 | Received Value 506 | Match Indicator 508 |
|---|---|---|---|
| 1 | 3 | 3 | Pass |
| 2 | 2 | 2 | Pass |
| 3 | 2 | 1 | Fail |
| 4 | 2 | 2 | Pass |
| 5 | True | True | Pass |
| 6 | False | True | Fail |

SYSTEMS AND METHODS FOR AUTHENTICATION OF COMMUNICATION PROCESSING SYSTEMS BASED ON USER PROFILE INFORMATION

BACKGROUND

As information, data, and other digital resources continue to be produced, stored, and exchanged, so does the need persist to implement data management that is able to authenticate users for access to sensitive stored data. For example, the amount of secure information stored within data centers has increased, with more sensitive information being exchanged between users, authenticators, and data storage entities. As such, data storage systems storing secure information may leverage user authentication systems that include user credentials such as passwords or usernames to verify the identity of such users. However, malicious entities who receive unauthorized access to user credentials (e.g., through hacking or phishing) may utilize these credentials to access sensitive information or receive unauthorized electronic resources. Thus, data storage systems may be susceptible to significant security breaches due to malicious entities or other unauthorized third parties.

SUMMARY

Pre-existing high-performance computing (HPC) systems may only provide access to system resources for authorized entities, such as registered users of the HPC system. Such pre-existing systems may provide registered users with a set of user credentials, such as a username and password, which users may provide to the HPC system to access system resources associated with the HPC system (e.g., to send data processing requests to nodes associated with a cluster within the HPC system). However, in situations where a registered user's credentials are exposed to a third party (e.g., through a phishing attempt or a credential interference device), sensitive system information may be unintentionally exposed to unauthorized parties. Pre-existing systems may implement further measures to mitigate these security attacks, such as firewalls, encryption, or increased complexity of user credentials (e.g., credentials requiring a one-time password). However, malicious entities continue to develop methods to circumvent such security features, thereby reducing the effectiveness of user credentials for security breach mitigation.

Systems and methods disclosed herein enable user authentication with publicly known credentials, thereby obviating the need to maintain the privacy of user credential information. For example, the disclosed system enables authentication of users of an HPC system by receiving public or known information associated with the user, such as a name, a username, or user contact information (e.g., an email address). To illustrate, a user may provide this publicly known user information to a user terminal (e.g., a computer or a mobile device associated with the user). The user terminal may transmit this information to an authentication server associated with the HPC system. Based on this public information, the authentication system enables confirmation of the user's identity and the associated user profile within the HPC system (e.g., the associated user account for file system access).

The disclosed authentication system may authenticate the identity of the user terminal to ensure that the user terminal is associated with the user. For example, the system may access profile information associated with the user (e.g., including the user's previous attempts to communicate with the HPC system). The system may determine a subset of this information that corresponds to communication between the user and the HPC system via the particular user terminal associated with the user's authentication request. Based on this subset of user profile information, the system may generate queries relevant to the user terminal regarding previous communications between the user and the terminal. For example, the system may generate queries requesting information relating to the number of the user's authentication attempts (e.g., a number of user requests to use clusters associated with the HPC system) via the user terminal within a specified time period, or a query relating to whether a particular communication was initiated by the user at a particular time. In response to transmitting these queries to the user terminal, the authentication system may receive a response from the user terminal, where the response addresses the queries (e.g., through receipt of a data structure storing numerical responses to each query presented by the authentication system).

By evaluating the consistency between the user terminal's responses and the actual user's profile information, the system may confirm that the user terminal corresponds to the user. By doing so, the system may prevent situations where a user terminal (e.g., a user device) that is not associated with the user (e.g., an unauthorized entity) attempts to simulate the user by providing the user's publicly available details. As such, the authentication system disclosed herein may enable authentication of a user's identity while preventing the need to securely store complex, private user credentials. Furthermore, the authentication system may enable authentication of the device through which the user is requesting authentication, thereby mitigating unauthorized or spoofed user authentication requests via unauthorized devices. Thus, the authentication system may enable streamlined, efficient, and secure communications (e.g., between an HPC system and a user via a user terminal), thereby conferring on the associated system both strengthened security and an improved user experience.

In some aspects, the system may receive a network request from a user (e.g., through a user terminal). For example, the system may receive, from a communication processing system of a plurality of communication processing systems, a network request associated with a client device. The network request may include communication data and user information including identification data associated with a user of the client device. As an illustrative example, the system may receive a request from the user that includes an indication of an electronic resource of the HPC system for which the user desires access, as well as information relating to the user's public credentials. The communication request may include a request to use a particular cluster of the HPC system for a specified amount of time. The user information may include data associated with the user's identity (which may be publicly available), such as a name, a username, the user's contact information, or the user's Internet Protocol (IP) address-determined location. By doing so, the system enables verification of the user's identity, supplying the authentication system with information for further authentication of the user and the associated user terminal.

In some aspects, the system may retrieve user profile information that is consistent with the user information and is associated with previous communications with the user terminal. For example, the system may determine, based on user profile information associated with the user, a subset of the user profile information corresponding to previous communications between the user and the communication processing system. As an illustrative example, the system may retrieve previous user requests for system resources (e.g., previous communications) based on a user database or activity log associated with the user. For example, such user requests may include timestamps associated with the user's requests, as well as values associated with such communications (e.g., a value for an amount of time requested for use of a cluster associated with the HPC system). The system may further filter this information for communication requests that originated from the present user terminal. By retrieving such information, the system extracts information that may aid in the verification of the user terminal through queries associated with this information.

In some embodiments, the system may filter the subset of the user profile information to include information associated with the resource (e.g., an HPC cluster) requested by the user, as well as the particular system identifier of the user terminal. For example, the system may determine, based on the communication data, a resource indicator associated with the network request and a system identifier of the communication processing system. The system may determine, from a communication database, a plurality of communications associated with the resource indicator and the system identifier. The system may generate the subset of the user profile information to include the plurality of communications. To illustrate, the system may filter user information associated with the user to include previous resource requests for the same HPC cluster and via the same user terminal, as identified by respective identifiers. By doing so, the system may generate queries that are relevant to the user's current request (e.g., queries that test the user terminal's previous interactions with the particular user and for the particular requested resource), thereby improving the specificity and relevance of the generated queries, as discussed below.

In some aspects, the system may generate queries for authentication of the user terminal. For example, the system may provide the subset of the user profile information to a query generation model to generate a plurality of queries that request parameters associated with the previous communications between the user and the communication processing system, where the plurality of queries includes a plurality of requests for a subset of the communication data. As an illustrative example, the system may generate queries associated with prior user activity (e.g., prior requests for HPC system resources received at the user terminal via the user terminal). The queries may request that the user terminal specify whether a particular user request for electronic resources (e.g., user of an HPC cluster) was communicated at a particular time. Additionally or alternatively, the queries may request information including a numerical value associated with these user requests (e.g., associated with a frequency of user requests, or values associated with the user requests, such as an amount of time requested by the user on an HPC cluster). By receiving such information, the system may verify whether the user terminal corresponds to a previously verified user terminal (e.g., by verifying whether this terminal possesses information relating to its previous communications).

In some aspects, the system may transmit the queries to the user terminal for authentication of the terminal. For example, the system may transmit, to the communication processing system, the plurality of queries. As an illustrative example, the system may transmit the queries to the user terminal, thereby requesting responses to the queries. The transmission may include a data structure that specifies the query (e.g., where various fields or values of the data structure indicate the particular types of communications to be characterized or queried by the user terminal). Additionally or alternatively, the transmission may include natural language queries associated with these previous communications.

In some aspects, the system may receive responses to the transmitted queries from the communication processing system. For example, the system may receive, from the communication processing system, a plurality of responses, where each response of the plurality of responses corresponds to an associated query of the plurality of queries and includes a corresponding parameter. As an illustrative example, the system may receive a data structure indicating values that correspond to the queries. For example, each element of the data structure may indicate a value that indicates an answer to a query regarding a previous communication associated with the user and the user terminal. For example, in response to a query relating to whether the user communicated a particular request for electronic resources at a specified time, the authentication system may receive a response indicating "True" or "False" based on the information stored within the user terminal. As such, the system may further evaluate and characterize the responses from the user terminal to verify its authenticity (e.g., to verify whether the terminal has handled previously recorded communication requests and, therefore, possesses information thereof).

In some aspects, the system may determine an authentication status for the user terminal based on the consistency between the responses and the associated queries. For example, the system may determine an authentication status based on whether parameters of the plurality of responses match parameters associated with the previous communications. As an illustrative example, the system may determine whether the requested responses to the queries match the expected response. For example, the system may receive a "True" or "False" value associated with a response to the query of whether the user communicated a particular request for electronic resources of the HPC system at a specified time. The system may determine whether, based on the previous communications, this request for resources was communicated at the specified time by the specified user. The system may compare this expected result to the response received from the user terminal. Based on this comparison, the system may determine whether the user terminal provided accurate information and, as such, provide an authentication status associated with the terminal. The authentication status may specify whether the given terminal is likely associated with the HPC system and whether the terminal has previously been associated with the user, thereby enabling evaluation of the user terminal.

In some embodiments, determining the authentication status may include determining a proportion of matched responses to expected responses. For example, the system may determine a plurality of match indicators, where each match indicator of the plurality of match indicators specifies whether a given parameter of the plurality of responses matches a given parameter of the subset of the user profile information. The system may determine a score associated with the plurality of match indicators, where the score indicates a proportion, of the plurality of match indicators, that indicate a match between the parameters of the plurality of responses and the parameters associated with the previous communications. The system may compare the score with a threshold. Based on determining that the score is greater than the threshold, the system may determine the authentication status for the communication processing system, where the authentication status indicates that the score is greater than the threshold. To illustrate, the system may determine a proportion of answers associated with the user terminal's response that are accurate (e.g., consistent with the authentication system's records). The system may compare this proportion to a threshold proportion prior to authentication of the system. By doing so, the system may capture situations where the user terminal provides outdated or incomplete information (e.g., due to communication errors), thereby providing an accuracy buffer and improving the robustness and reliability of the authentication system.

In some aspects, the system may transmit a request to execute the user's requested communication (e.g., network request) based on the authentication status for the user terminal. For example, based on the authentication status for the communication processing system, the system may transmit, to an administrator system, a communication request associated with the communication data. As an illustrative example, the system may transmit a request to execute the request by the user. For example, the system may generate a communication request that includes a command to provide access to electronic resources requested by the user (e.g., access to requested clusters of the HPC system via the user terminal), based on determining that the user terminal is valid (e.g., that it is unlikely that the user terminal is spoofing the user's information). As such, the system enables the provision of electronic resources to the user, even if credential information associated with the user is publicly known or leaked. The authentication of the intervening user terminal prevents spoofing attacks in such a system, thereby improving the security and accessibility of the HPC system.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 shows an illustrative schematic of communication data and user information associated with a network request, in accordance with one or more embodiments.

FIG. 4 shows an illustrative schematic of a subset of user profile information and an associated plurality of queries, in accordance with one or more embodiments.

FIG. 5 shows an illustrative schematic of a plurality of match indicators associated with responses from a communication processing system, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
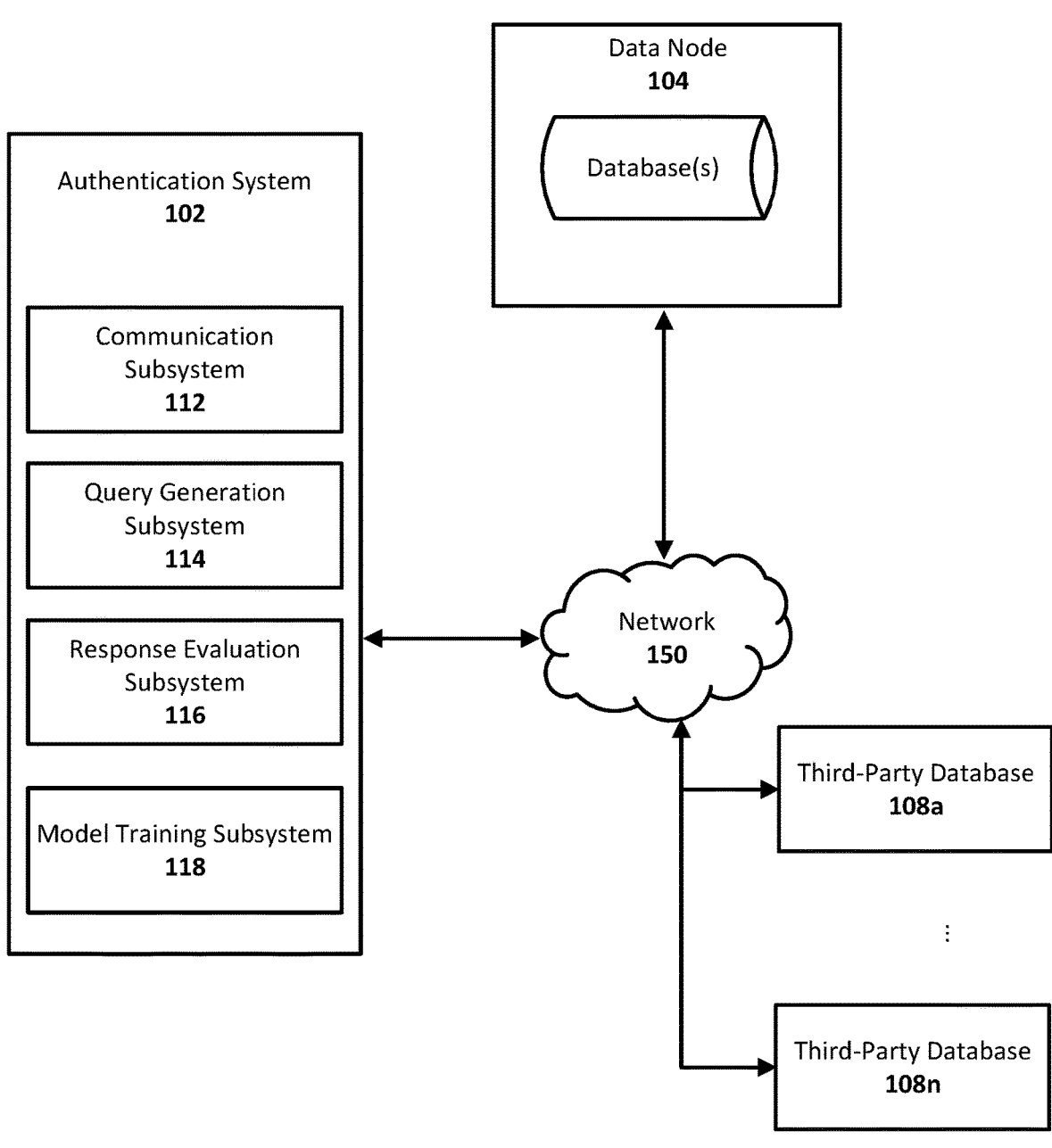
FIG. 1 shows an illustrative environment for authenticating communications with a secure system via a communication processing system, in accordance with one or more embodiments.

FIG. 1 shows illustrative environment 100 for authenticating communications with a secure system via a communication processing system, in accordance with one or more embodiments. Environment 100 may include authentication system 102, data node 104, and one or more third-party databases 108a-n, any of which may be configured to communicate with network 150. Authentication system 102 may include software, hardware, or a combination of both and may reside on a physical server or a virtual server running on a physical computing system. In some embodiments, authentication system 102 may be configured on a user device (e.g., a laptop computer, a smartphone, a desktop computer, an electronic tablet, or another suitable user device). Furthermore, authentication system 102 may reside on a server or node and/or may interface with breach detection systems either directly or indirectly. Authentication system 102 may include subsystems, such as communication subsystem 112, query generation subsystem 114, response evaluation subsystem 116, and/or model training subsystem 118.

Data node 104 may store various data, including one or more machine learning models, training data, parameters, user communications, public and/or private keys, queries, responses, or other suitable data. Data node 104 may include software, hardware, or a combination of the two. In some embodiments, authentication system 102 and data node 104 may reside on the same hardware and/or the same virtual server or computing device. Network 150 may be a local area network, a wide area network (e.g., the internet), or a combination of the two. Third-party databases 108a-108n may reside on client devices (e.g., desktop computers, laptops, electronic devices, smartphones, servers, and/or other computing devices that interact with network 150, cloud devices, or servers).

Authentication system 102 may receive and/or otherwise communicate network requests, queries, responses, parameters associated with communication data, and other suitable information to or from one or more devices. Authentication system 102 may communicate such data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or otherwise communicate with data node 104 or another computing device. Communication subsystem 112 may receive data, such as network requests, responses, queries, user information, user profile information, associated parameters, or other suitable information relating to an HPC system and/or a communication network (e.g., an administrator system associated with a transaction network for settlement of financial transactions). Communication subsystem 112 may communicate with query generation subsystem 114, response evaluation subsystem 116, and/or model training subsystem 118.

In some embodiments, authentication system 102 may include query generation subsystem 114. Query generation subsystem 114 may perform tasks that include the generation of queries for authentication of communication processing systems (e.g., user terminals, such as point-of-sale systems associated with merchants). For example, query generation subsystem 114 may include one or more machine learning models for generation of queries based on user profile information retrieved from data node 104 (e.g., where the user profile information is related to a network request received via communication subsystem 112 for settlement of a transaction between a user and a merchant). The machine learning model may generate one or more queries for transmission to the communication processing system for authentication. Query generation subsystem 114 may include software components, or may include one or more hardware components (e.g., processors) that are able to execute operations for generating queries from user profile information relating to previous transactions between the user and a merchant associated with the user terminal. Query generation subsystem 114 may directly access data, systems, or nodes associated with third-party databases 108a-108n and may be able to transmit data to such nodes. Additionally or alternatively, query generation subsystem 114 may receive data from and/or send data to communication subsystem 112, response evaluation subsystem 116, and/or model training subsystem 118.

Response evaluation subsystem 116 may execute tasks relating to evaluating responses from communication processing systems (e.g., user terminals, such as point-of-sale systems) and/or from associated users. For example, response evaluation subsystem 116 may generate match indicators and an authentication status based on whether responses from a user terminal match expected responses (e.g., based on user profile information accessible to authentication system 102). Response evaluation subsystem 116 may include software components, hardware components, or a combination of both. For example, in some embodiments, response evaluation subsystem 116 may receive responses from a communication processing system (e.g., via communication subsystem 112) to queries generated by query generation subsystem 114 to enable verification of the communication processing system. Data from response evaluation subsystem 116 may be accessible to communication subsystem 112, query generation subsystem 114, and/or model training subsystem 118. Additionally or alternatively, response evaluation subsystem 116 may receive information or data from communication subsystem 112, query generation subsystem 114, and/or model training subsystem 118.

Model training subsystem 118 may execute tasks relating to training machine learning models (e.g., a query generation model for generating queries). For example, model training subsystem 118 may receive, obtain, or generate training data including training user profile information and training queries to train a query generation model to generate queries based on user profile information (e.g., associated with previous transactions between users and corresponding communication processing systems). For example, model training subsystem 118 may access or store model parameters associated with a machine learning model for query generation (e.g., parameters associated with hidden layers of an artificial neural network). Model training subsystem 118 may include software components such as application programming interface (API) calls, hardware components, or a combination of both. Model training subsystem 118 may interface with other subsystems and/or nodes of environment 100, such as data node 104, third-party databases 108a-108n (e.g., via network 150), communication subsystem 112, query generation subsystem 114, and/or response evaluation subsystem 116.

Figure 2:
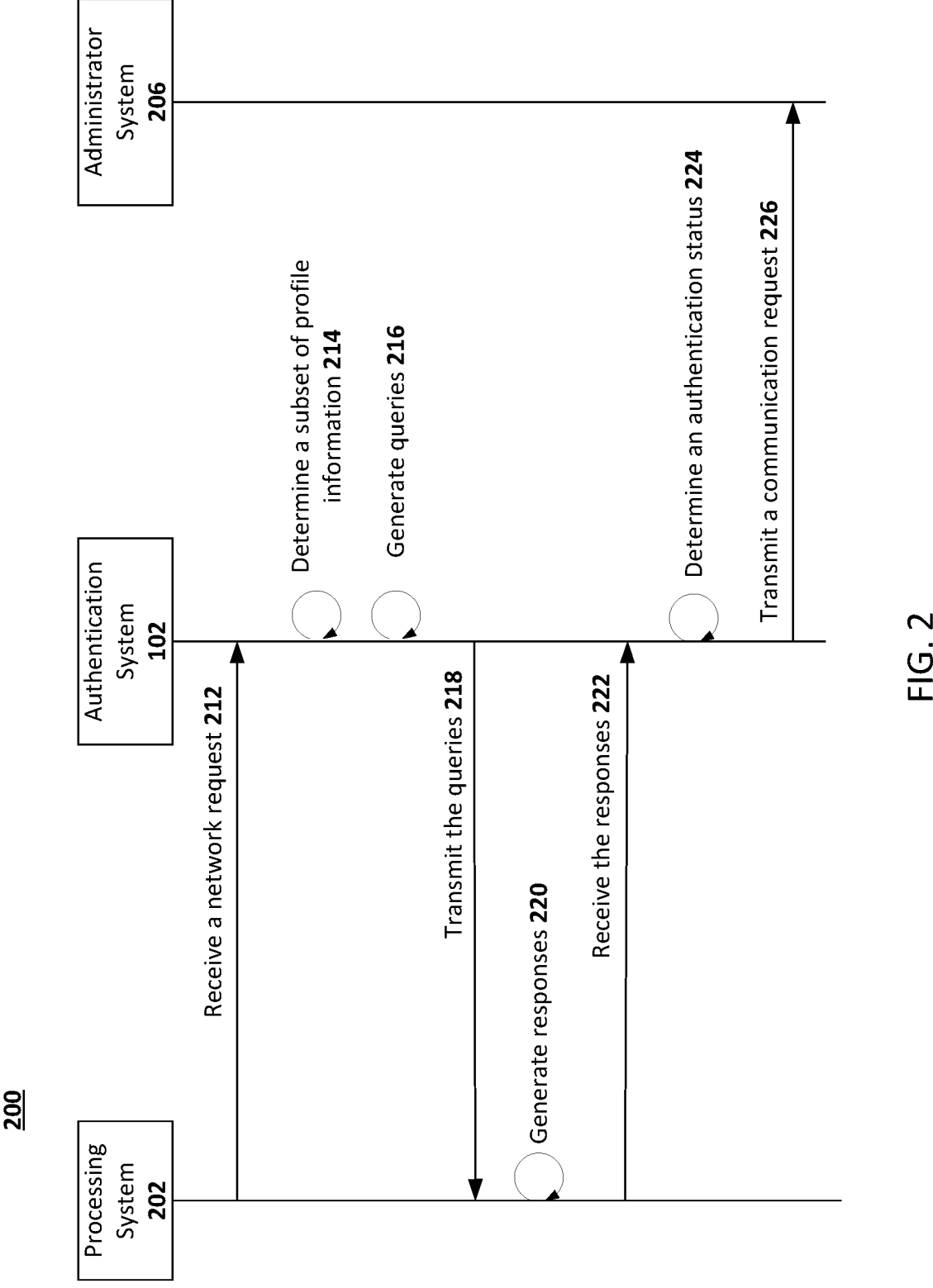
FIG. 2 shows an illustrative schematic of a process for authenticating a communication processing system using an authentication system, in accordance with one or more embodiments.

FIG. 2 shows an illustrative schematic of a process for authenticating a communication processing system using an authentication system, in accordance with one or more embodiments. For example, process 200 enables authentication of user terminals, such as processing system 202 (e.g., point-of-sale systems for merchants), within a paradigm where user authentication is based on publicly available or non-private data. For example, processing system 202 may transmit information to authentication system 102 (e.g., an authentication server associated with a payment network) to enable access to resources associated with administrator system 206 (e.g., associated with a financial resource, such as a banking system).

A communication processing system (e.g., processing system 202) may include a system, device, or server associated with processing communications (e.g., between a user/client device and a secure system, such as an HPC system or a banking/financial system). In some embodiments, a communication processing system may include a point-of-sale system associated with a merchant. For example, the communication processing system may include a user interface where the user may communicate a request for a resource (e.g., an electronic resource, such as a digital currency for payment for an item to the merchant). As such, the communication processing system may serve as a node for the communication of requests to authenticate the user's identity and/or credentials. The user may provide information such as user credentials, usernames, passwords, bank account or credit account numbers, security codes, or other similar information to the communication processing system for authentication of a given transaction with the associated merchant. The communication processing system may be one of a network of such processing systems (e.g., a network of point-of-sale systems) that are associated with the given authentication system and/or administrator system. A communication processing system may be associated with a system identifier (e.g., thereby uniquely identifying the associated point-of-sale system and/or the associated merchant). Additionally or alternatively, the communication processing system may include a system for processing requests for access to electronic resources associated with a secure HPC system (e.g., a client device registered with the user that may communicate with authentication system 102). As such, the communication processing system may serve as an interface between the user and an administrator system for authentication of users' requests for payments (e.g., to an associated merchant) or other electronic resources.

A client device may include a device associated with a user and/or a device that is capable of communicating with a server system. For example, a client device may include a mobile device associated with a user, through which a request for authentication is made. The client device may communicate with processing system 202, such as through a near-field communication (NFC) terminal. In some implementations, the client device may be associated with a physical token (e.g., a credit card or an identification card, such as a chip-enabled driver's license). As such, the client device may provide user information, as well as transaction information (e.g., communication data) associated with the transaction requested by the user, to the communication processing system, which may subsequently enable authentication of the associated network request.

An administrator system (e.g., administrator system 206) may include a system associated with executing and/or settling requests associated with a given system. For example, an administrator system may include a system associated with processing transactions (e.g., such as a server associated with a payment network). In some implementations, the administrator system is associated with a bank or another financial institution, and/or may manage bank accounts, credit accounts, or other suitable user accounts. The administrator system may modify and/or transfer electronic resources between associated user accounts (e.g., through initiation of transfers of funds), for example based on commands (e.g., communication requests) from authentication system 102. Additionally or alternatively, an administrator system may include a system for managing a network of computational devices (e.g., an HPC system). For example, administrator system 206 may process requests for electronic resources by assigning resources (e.g., clusters) to associated users according to each user's identity and the communication processing system's authentication status.

At operation 212 of process 200 shown in FIG. 2, authentication system 102 may receive a network request from processing system 202. For example, authentication system 102, through communication subsystem 112, may receive, from a communication processing system of a plurality of communication processing systems, a network request associated with a user, wherein the network request comprises communication data and user information for the user. As an illustrative example, authentication system 102 may receive information relating to a network request from a point-of-sale system associated with a merchant that indicates information that identifies the user (e.g., customer information, such as the customer's name, birthday, or other similar identification information that may be publicly available). Furthermore, the network request to the authentication system may include information relating to the requested transaction (e.g., indicating a value of the transaction, such as a price, an identifier of the item to be purchased, such as a resource identifier, and/or an identifier of the point-of-sale system). By doing so, authentication system 102 may receive information for verification/authentication of a given network request (e.g., a request to transfer electronic resources from an account associated with the user to an account associated with the merchant).

FIG. 3 shows illustrative schematic 300 of communication data and user information associated with a network request, in accordance with one or more embodiments. For example, data structure 310 may include communication data associated with a network request, including fields 312 and associated values 314. Data structure 320 may include user information associated with the network request, including fields 322 and associated values 324. By receiving a network request from a communication processing system, authentication system 102 may evaluate the authenticity of a given processing system and the associated network request (e.g., transaction request).

A network request may include information relating to a request for a communication, transaction, or another action associated with an authentication system and/or an administrator system. For example, a network request includes a request to initiate a transaction (e.g., a settlement of a transaction) between the user and a merchant associated with the associated point-of-sale system (e.g., processing system 202). Additionally or alternatively, a network request includes a request relating to use of electronic resources associated with a computing system (e.g., an HPC system and/or a financial/banking system). For example, the network request can include a request for a communication (e.g., a command) for execution of tasks relating to the given computing system, such as movement of files, transactions, or the use of processors associated with clusters of the computing system.

The network request may include communication data that characterizes the nature of this transaction. For example, data structure 310 associated with communication data may include information relating to a requested resource (e.g., a resource identifier), an associated resource value, and a system identifier (e.g., a unique identifier of the point-of-sale system within the associated payment network managed by administrator system 206). For example, the communication data may include an identifier of the merchant associated with the point-of-sale system, an identifier of an item that the user is attempting to purchase from the merchant, and/or a monetary value of the purchase (e.g., in terms of a given currency). As such, the communication data provides information relating to actions requested to be taken with respect to administrator system 206 (e.g., information relating to transactions and/or other communications to be executed by a payment network associated with administrator system 206).

User information may include information relating to a user associated with the network request. For example, user information may include information identifying a customer of the merchant associated with a communication processing system (e.g., processing system 202). The user information may include identification data, including publicly accessible information (e.g., user identifiers), such as a name, a birthday, a username, an IP address associated with the user (e.g., the user's mobile device/a client device), a browser language, contact information (e.g., a phone number), an indication of how recently such information has been updated, recent bank account changes and/or account age, historical transactions, velocity metrics, or other such information. Additionally or alternatively, in some implementations, user information may include private information, such as private user credentials (e.g., credit card numbers, bank account numbers, security codes, and/or encrypted information associated with a banking card). As such, authentication system 102 enables identification and verification of an entity associated with a network request (e.g., a customer associated with a transaction with a merchant) on the basis of public and/or private information, thereby enabling authentication of communications (e.g., transactions) associated with secure systems without the need to maintain the privacy of associated user information.

At operation 214 of process 200 shown in FIG. 2, authentication system 102 may access and/or determine a subset of user profile information associated with the user. For example, authentication system 102 may determine, based on user profile information associated with the user, a subset of the user profile information corresponding to previous communications between the user and the communication processing system. As an illustrative example, authentication system 102, through query generation subsystem 114, may retrieve information associated with previous communications associated with the user (e.g., a customer) via a communication processing system (e.g., a merchant's point-of-sale system). For example, authentication system 102 may retrieve a set of communications (e.g., previous transactions) between the user and the merchant, including associated timestamps, communication values (e.g., monetary values of associated purchases), identifiers of associated resources (e.g., item identifiers, such as stock-keeping unit (SKU) numbers) and any other relevant information. Authentication system 102 may retrieve such information from a ledger of previous transactions or communications (e.g., associated with administrator system 206). By retrieving such information, authentication system 102 obtains information that may be known to the communication processing system (e.g., the point-of-sale system associated with the merchant), enabling further authentication of the point-of-sale system (e.g., for mitigation of spoofing).

FIG. 4 shows an illustrative schematic of a subset of user profile information and an associated plurality of queries, in accordance with one or more embodiments. For example, data structure 400 may include user profile information, including data associated with previous communications between a user (e.g., a customer) and an entity associated with a communication processing system (e.g., via a point-of-sale system). Data structure 400 may include communication types 402, timestamps 404, and/or values 406 associated with these previous communications. For example, authentication system 102 may receive user profile information characterizing the communication (e.g., as a "transaction" or a "data processing request"). For example, data structure 410 may include queries generated based on user profile information (or a subset thereof). Such queries may include query identifiers 412, requested values 414, condition arguments 416, query conditions 418, and/or query condition values 420. The queries enable the system to probe communication processing systems for possession of data, thereby enabling authentication of such systems.

User profile information may include information relating to previous transactions. For example, user profile information may include communication records including a set of transactions (e.g., associated with purchases) associated with the user and a set of merchants. The user profile information may include parameters such as timestamps 404 that correspond to the transactions, thereby enabling authentication system 102 to obtain temporal information relating to the users' previous behavior and interactions. In some implementations, user profile information includes information relating to values associated with these transactions (e.g., monetary values, or numerical transaction identifiers), including purchase prices or other such information. User profile information may include system identifiers that specify communication processing systems (e.g., associated with particular merchant identifiers) and/or resource identifiers (e.g., associated with particular items purchased from the particular merchant), thereby enabling characterization of the associated communications. User profile information may be associated with or stored within data node 104 and/or a system associated with administrator system 206 (e.g., within a user database that includes transactions associated with multiple users). For example, user profile information may be stored within a blockchain or another suitable ledger. By retrieving such information, authentication system 102 receives information relating to activities (e.g., communications or transactions) that may be known by both the user and the associated communication processing device, providing a manner in which to probe the authenticity of the user and the communication processing device.

In some embodiments, authentication system 102 may determine a subset of user profile information. For example, user profile information obtained may include information associated with a variety of merchants (e.g., other communication processing systems of the plurality of communication processing systems) and/or a variety of purchases (e.g., a variety of resources associated with different resource identifiers). Authentication system 102, through query generation subsystem 114, may filter the user profile information by merchant identifier (e.g., system identifier) and/or by items purchased (e.g., item identifier). By doing so, authentication system 102 determines information that may be stored within or known to the particular communication processing system, thereby enabling verification of the communication processing system's authenticity.

In some embodiments, authentication system 102 may generate user profile information based on communication records. For example, authentication system 102 may retrieve, from a user database, a plurality of communication records. Authentication system 102 may determine a plurality of parameter sets. Each parameter set of the plurality of parameter sets may be associated with a given communication record of the plurality of communication records. The given communication record may be associated with a given historical communication between the user and a given communication processing system of the plurality of communication processing systems. In some implementations, authentication system 102 may generate the user profile information comprising the plurality of parameter sets. For example, authentication system 102 may determine transaction records, which include parameters associated with these records (e.g., monetary values associated with the transactions, timestamps, system identifiers, or other such information). By retrieving such information, authentication system 102 enables verification of whether the communication processing system possesses information relating to transactions that were executed via the communication processing system, thereby providing an authentication method for such point-of-sale systems.

In some embodiments, authentication system 102 may generate the subset of user profile information by filtering this information for communications associated with the particular resource and communication processing system associated with the network request. For example, authentication system 102 may determine, based on the communication data, a resource indicator associated with the network request and a system identifier of the communication processing system. Authentication system 102 may determine, from a communication database, a plurality of communications associated with the resource indicator and the system identifier. Authentication system 102 may generate the subset of the user profile information to include the plurality of communications. For example, authentication system 102 may generate the subset of user profile information to include transactions that are associated with a particular resource (e.g., a particular purchased item that the user has purchased in the past), as well as with the particular merchant (e.g., via the system identifier of the associated point-of-sale system). By retrieving such information, authentication system 102 may generate queries to authenticate the communication processing system based on information that may be known to the communication processing system. Furthermore, by specifying resources (e.g., purchased items) that have been associated with previous transactions, authentication system 102 selects information that may be relevant to longer-term trends associated with purchases of the item, thereby improving the sensitivity of merchant authentication.

In some embodiments, authentication system 102 may generate the subset of user profile information by filtering this information for communications associated with the particular user and communication processing system associated with the network request. For example, authentication system 102 may determine, based on the communication data, a user identifier associated with the user and a system identifier of the communication processing system. Authentication system 102 may determine, from a communication database, a plurality of communications associated with the user identifier and the system identifier. Authentication system 102 may generate the subset of the user profile information to include the plurality of communications. As an illustrative example, authentication system 102 may generate queries to authenticate the communication processing system based on information that may be known to the communication processing system in particular. Furthermore, by specifying communications (e.g., transactions) particular to the user associated with the network request, authentication system 102 selects information that may be relevant to longer-term habits or behaviors associated with the user (e.g., by regular customers of the merchant), thereby improving the sensitivity of merchant authentication.

At operation 216 of process 200 shown in FIG. 2, authentication system 102 (e.g., through query generation subsystem 114) may generate queries to probe the authenticity of the communication processing system (e.g., processing system 202). For example, authentication system 102 may provide the subset of the user profile information to a query generation model to generate a plurality of queries that request parameters associated with the previous communications between the user and the communication processing system. The plurality of queries may include a plurality of requests for a subset of the communication data. As an illustrative example, authentication system 102 may generate queries that request information that characterizes the previous communications (e.g., the information within the subset of user profile information). For example, authentication system 102 may provide the subset of the user profile information to a query generation model to generate queries that indicate a request for information that characterizes the communications associated with the subset of the user profile information. For example, the queries may request characterization of the frequency and/or the existence of previous transactions between the merchant and the user. By doing so, authentication system 102 enables authentication of the associated communication processing system (e.g., point-of-sale system associated with the merchant), thereby mitigating spoofing or other fraudulent behavior.

A query generation model may include a model that enables generation of queries based on user profile information. For example, a query generation model includes an algorithm that generates a data structure (e.g., data structure 410 of FIG. 4) that solicits responses from another system (e.g., a communication processing system) that characterize the information within the subset of the user profile information. To illustrate, the query generation model may accept data structure 400 (e.g., including a set of transactions/communications, associated times, and/or other parameters), as shown in FIG. 4, as input, and may output data structure 410 (e.g., query identifiers 412, requested values 414, condition arguments 416, query conditions 418, and/or query condition values 420). In some implementations, the query generation model may include a machine learning model, such as an artificial neural network (e.g., including model parameters associated with hidden layers of the artificial neural network), and may be trained on associated training data (e.g., as discussed below).

A query may include a request for information. For example, a query may include a request for information characterizing one or more transactions or communications associated with the user profile information (or the subset thereof). For example, the query may include a query identifier 412 (e.g., thereby uniquely identifying the particular query with respect to the other queries of the plurality of generated queries). In some implementations, a query includes a requested value. For example, the requested value may include an indication of a variable type or a characterization of the type of information solicited via the query. For example, data structure 410 includes a query requesting a "count" (e.g., a count of particular transactions that satisfy a given condition). The given condition may be provided by condition arguments 416, which may specify which parameter of given transactions is to be considered within query's condition.

For example, the condition argument may specify that the "count" (e.g., the requested value) is to be determined based on evaluating the specified condition argument (e.g., the "timestamp") associated with the transactions within the subset of the user profile information. The query conditions 418 may provide a condition with which to evaluate the condition argument, such as with respect to query condition values 420. For example, for the query with query identifier "1" shown in data structure 410 of FIG. 4, the query requests a count of all transactions with a timestamp that is less than a timestamp of value "Timestamp 7." Additionally or alternatively, the query associated with query identifier 6 may request a Boolean value (e.g., a "true" or "false" value) that indicates whether a transaction with a value of "Value 7" (e.g., a monetary value) exists within the user profile information. By generating queries within a structured format, the query generation model enables responses to such queries to probe the consistency of these responses within the stored user profile information, thereby enabling verification of the authenticity of the associated communication processing system. In some implementations, the queries are presented as natural language tokens (e.g., sentences or questions in a particular natural language) and/or in an unstructured format (or another format).

In some embodiments, authentication system 102 may generate queries based on parameters associated with a particular resource indicator (e.g., an indication of a particular purchased item). For example, authentication system 102, through query generation subsystem 114, may determine a set of parameters associated with the resource indicator. Authentication system 102 may generate a first query requesting a parameter of the set of parameters. Authentication system 102 may generate the plurality of queries comprising the first query. As an illustrative example, authentication system 102 may generate parameters that solicit information relating to the existence of transactions that are associated with particular purchased items. By doing so, authentication system 102 enables improved sensitivity of the authentication of the communication processing system (e.g., the point-of-sale terminal associated with the merchant) on the basis of purchased items.

In some embodiments, authentication system 102 may generate queries based on parameters associated with a particular user identifier. For example, authentication system 102 may determine a set of parameters associated with the user identifier. Authentication system 102 may generate a first query requesting a parameter of the set of parameters. Authentication system 102 may generate the plurality of queries comprising the first query. As an illustrative example, authentication system 102 may generate parameters that solicit information relating to the existence of transactions that are particular to the user associated with the network request (e.g., that are particular to the customer associated with a transaction request associated with the network request). By doing so, authentication system 102 enables improved sensitivity of authentication of the communication processing system (e.g., the point-of-sale terminal associated with the merchant) in a manner that is user-specific (e.g., thereby preventing communication of information associated with other users, which may present a security risk in the event of interception of communications).

At operation 218 of process 200 shown in FIG. 2, authentication system 102 may transmit the queries to the point-of-sale system associated with the merchant. For example, authentication system 102, via communication subsystem 112, may transmit, to the communication processing system, the plurality of queries. To illustrate, authentication system 102 may transmit data structure 410, shown in FIG. 4, to a device associated with the communication processing system (e.g., to a server controlling point-of-sale terminals of the point-of-sale system). By doing so, authentication system 102 may probe the authenticity of the point-of-sale system by soliciting information in response to the queries.

At operation 220 of process 200 shown in FIG. 2, processing system 202 (e.g., a point-of-sale system) may generate responses to the queries. At operation 222 of FIG. 2, authentication system 102 may receive the responses from the point-of-sale system. For example, authentication system 102, via communication subsystem 112, may receive, from the communication processing system, a plurality of responses. Each response of the plurality of responses may correspond to an associated query of the plurality of queries and may comprise a corresponding parameter. As an illustrative example, authentication system 102 may receive a particular response corresponding to each query of the plurality of queries (e.g., a value, such as a count or a Boolean value) in response to the conditions solicited by the query. By doing so, authentication system 102 enables evaluation of the accuracy or availability of information associated with the communication processing system (e.g., point-of-sale terminal), enabling authentication of the associated system.

At operation 224 of process 200 shown in FIG. 2, authentication system 102, through response evaluation subsystem 116, may generate an authentication status for the communication processing system based on evaluating the plurality of responses. For example, authentication system 102 may determine an authentication status based on whether parameters of the plurality of responses match parameters associated with the previous communications. As an illustrative example, authentication system 102 may determine whether the responses (e.g., characterizing transactions between the user and the point-of-sale system corresponding to the communication processing system) match expected responses (e.g., as included within the subset of the user profile information). By doing so, authentication system 102 enables evaluation of the extent to which the communication processing system provides accurate responses, thereby enabling authentication of the communication processing system (e.g., and the associated merchant). The authentication status may include an indication of whether the communication processing system is associated with a sufficient likelihood of corresponding to a valid communication processing system or not.

FIG. 5 shows an illustrative schematic of a plurality of match indicators associated with responses from a communication processing system, in accordance with one or more embodiments. For example, data structure 500 includes responses (e.g., received values 506) associated with queries identified by query identifiers 502. Data structure 500 may include expected values 504 that characterize parameters associated with user profile information, to be compared with received values 506 for generation of match indicators 508, as discussed below.

In some implementations, authentication system 102, through response evaluation subsystem 116, may generate match indicators that characterize whether parameters of the plurality of responses match parameters of the subset of user profile information. For example, authentication system 102 may determine a plurality of match indicators, wherein each match indicator of the plurality of match indicators specifies whether a given parameter of the plurality of responses matches a given parameter of the subset of the user profile information. Authentication system 102 may determine a score associated with the plurality of match indicators. The score may indicate a proportion, of the plurality of match indicators, that indicate a match between the parameters of the plurality of responses and the parameters associated with the previous communications. Authentication system 102 may compare the score with a threshold. Based on determining that the score is greater than the threshold, authentication system 102 may determine the authentication status for the communication processing system. The authentication status may indicate that the score is greater than the threshold. As an illustrative example, authentication system 102 may determine whether particular requested values (e.g., expected values 504, including parameters associated with the queries) match the responses received from the communication processing device (e.g., received values 506, including parameters associated with the responses). Authentication system 102 may determine a proportion of these values that match; based on this proportion, authentication system 102 may determine to authenticate the associated point-of-sale system (e.g., communication processing system). By doing so, authentication system 102 may allow the communication processing system a buffer (e.g., in case of communication errors or corrupted data), thereby improving the robustness and resilience of the authentication system.

In some embodiments, authentication system 102, through response evaluation subsystem 116, may generate the threshold based on user input (e.g., with respect to the security level and/or level of trust associated with the given merchant). For example, authentication system 102 may transmit, to a device associated with the user, a request for security information associated with the communication processing system, wherein the security information includes information relating to user trust for the communication processing system. Authentication system 102 may receive, from the device, an indication of a security level for the communication processing system. Authentication system 102 may generate the threshold according to the indication of the security level. As an illustrative example, authentication system 102 may request that the user specify a level of trust associated with the merchant associated with the communication processing system (e.g., on a scale from 0 to 5); based on this security level, authentication system 102 may determine an associated threshold score. As an illustrative example, in situations where the user may not have a significant amount of trust in the communication processing system, authentication system 102 may determine a higher threshold score (e.g., a high security level, with a threshold score associated with a proportion of nearly or equal to 100%), thereby making authentication more sensitive and stringent. Additionally or alternatively, in situations where the user may have significant trust in the communication processing system, authentication system 102 may determine a lower threshold score (e.g., a low security level, with a threshold score associated with a proportion of less than 100%). By doing so, authentication system 102 leverages user input to determine a threshold with which to evaluate the accuracy of responses from the communication processing system.

In some embodiments, authentication system 102, through response evaluation subsystem 116, may determine an authentication status based on determining a score lower than the threshold. For example, authentication system 102 may determine that the score is less than the threshold. Based on determining that the score is less than a second threshold, authentication system 102 may determine the authentication status for the communication processing system. The authentication status may indicate that the score is less than the threshold. As an illustrative example, authentication system 102 may generate an authentication status that indicates that the point-of-sale system associated with the communication processing system and/or the associated merchant is not authenticated on the basis of the responses received in response to the query. Based on this determination, authentication system 102 may generate an indication (e.g., a Boolean value) that indicates that the authentication status is not valid. By doing so, authentication system 102 may capture situations where a given communication processing system may be associated with fraudulent behavior (e.g., spoofing). In some implementations, authentication system 102 may determine not to transmit communication requests associated with the communication data to an administrator system on the basis of this determination, thereby protecting the user and/or associated electronic resources (e.g., digital currency) from potential fraudulent transactions.

At operation 226 of process 200 shown in FIG. 2, authentication system 102, through communication subsystem 112, may transmit a communication request to administrator system 206. For example, based on the authentication status for the communication processing system, authentication system 102 may transmit, to an administrator system, a communication request associated with the communication data. To illustrate, authentication system 102 may transmit a request to execute a requested communication (e.g., as specified by the communication data associated with the network request). For example, authentication system 102 may transmit a command to an administrator system associated with a payment system (e.g., and/or associated banks or financial institutions) requesting execution of a transaction between an account associated with the merchant and an account associated with the user. By doing so, authentication system 102 enables execution of requested communications after verification that the communication processing system (e.g., point-of-sale terminal) is valid based on possession of information known to be associated with the processing system.

In some embodiments, based on determining that the authentication status is invalid, authentication system 102 may transmit further queries to the communication processing system for authentication. For example, based on determining that the score is less than the threshold, authentication system 102 may provide the user profile information to the query generation model to generate a second plurality of queries that request additional parameters associated with the previous communications. Authentication system 102 may transmit, to the communication processing system, the second plurality of queries. Authentication system 102 may receive, from the communication processing system, a second plurality of responses. Based on the second plurality of responses, authentication system 102 may determine a second authentication status for the communication processing system. Based on the second authentication status, authentication system 102 may transmit, to the administrator system, the communication request associated with the communication data. As an illustrative example, authentication system 102 may generate a new set of queries based on the previous communications (e.g., within the user profile information, including information beyond the subset). By doing so, authentication system 102 may authenticate the communication processing system (e.g., the point-of-sale system for a merchant) based on other information. For example, in some situations, the communication processing system may have erroneous data with respect to particular users or items (e.g., due to data entry errors)—by re-sending a different set of queries, authentication system 102 enables authentication of the communication processing system in the event of such errors.

In some embodiments, authentication system 102 may verify the identity of a user based on verifying encrypted data associated with the user. For example, authentication system 102 may determine, based on a user database, a public key associated with the user. Authentication system 102 may transmit, to a device associated with the user, a user authentication request. The user authentication request may include an encrypted token (e.g., a word, value, phrase, set of characters, or suitable piece of data). The encrypted token may include data encrypted using the public key associated with the user. Authentication system 102 may receive, from the device, authentication data. Authentication system 102 may compare the authentication data with the data encrypted using the public key. Based on determining that the authentication data matches the data encrypted using the public key, authentication system 102 may generate a user authentication status for the user. Based on the authentication status for the communication processing system and the user authentication status, authentication system 102 may transmit the communication request associated with the communication data. As an illustrative example, authentication system 102 may include a token, a signature, or another piece of data that has been encrypted using the public key of the user. Authentication system 102 may transmit this encrypted data to a user; the user may decrypt the data using a corresponding private key, and transmit this data back to the system to prove the user's identity (e.g., to prove that the user is in possession of the private key associated with the claimed user's public key). By doing so, authentication system 102 may authenticate that the user is indeed attempting to execute the network request, thereby enabling direct authentication of the user.

In some embodiments, authentication system 102 (e.g., through model training subsystem 118) may train the query generation model using training data. For example, authentication system 102 may receive training data. The training data may include training user information and training queries. Authentication system 102 may provide the training data to the query generation model to train the query generation model to generate output queries based on input user information. For example, authentication system 102 may receive transaction data (e.g., transaction records) associated with a variety of users (e.g., associated with a payment system associated with administrator system 206). The system may receive associated queries that solicit information characterizing this transaction data. Based on providing this data to the query generation model, the system may train the model to generate queries based on user profile information (e.g., including communication records). As such, authentication system 102 may generate complex, intricate, and dynamic queries based on the nature of provided training data.

In some embodiments, authentication system 102 (e.g., through model training subsystem 118) may update model parameters of an artificial neural network based on this training data. For example, authentication system 102 may provide the training data to the query generation model comprising an artificial neural network. The artificial neural network may include model parameters associated with hidden layers of the artificial neural network. Authentication system 102 may update the model parameters based on the training data. For example, authentication system 102 may generate a vector or array representation of the training data and utilize a training algorithm (e.g., backpropagation) to update model parameters associated with the artificial neural network, to update the manner in which queries are generated based on input user profile information (e.g., communication records). By doing so, authentication system 102 enables generation of complex queries, thereby improving the security of the underlying system (e.g., payment system associated with administrator system 206).

In some embodiments, authentication system 102 may generate further queries based on a query generation model that generates queries based on parameter data available within the user profile information. For example, authentication system 102 may determine (e.g., through the query generation model) a set of parameter indicators and associated parameter data associated with the user profile information. Authentication system 102 may generate the plurality of queries including requests for parameter data associated with parameter indicators of the set of parameter indicators. As an illustrative example, authentication system 102 may determine fields or information available within the user profile information (e.g., associated with resources, items, or other information characterizing communications within the user profile information). Based on these fields, authentication system 102 may generate queries in an algorithmic manner that asks for values associated with these fields. By doing so, authentication system 102 enables efficient query generation without the need to store model parameters and/or process a heavyweight machine learning model.

In some embodiments, authentication system 102 may verify the user based on transmitting queries to the user. For example, authentication system 102 may transmit, to a device associated with the user, a first query of the plurality of queries. Authentication system 102 may receive, from the device, a user response. Authentication system 102 may compare the user response with a corresponding response of the plurality of responses, wherein the corresponding response is associated with the first query. Authentication system 102 may determine that the user response matches the corresponding response. Based on determining that the user response matches the corresponding response, authentication system 102 may transmit, to the administrator system, the communication request. As an illustrative example, authentication system 102 may determine that the user response to a query corresponds to the associated response from the communication processing system. By doing so, authentication system 102 may verify the authenticity of both the user and the point-of-sale system, thereby limiting the incidence of fraudulent behavior (e.g., spoofing) associated with the authentication system.

Figure 6:
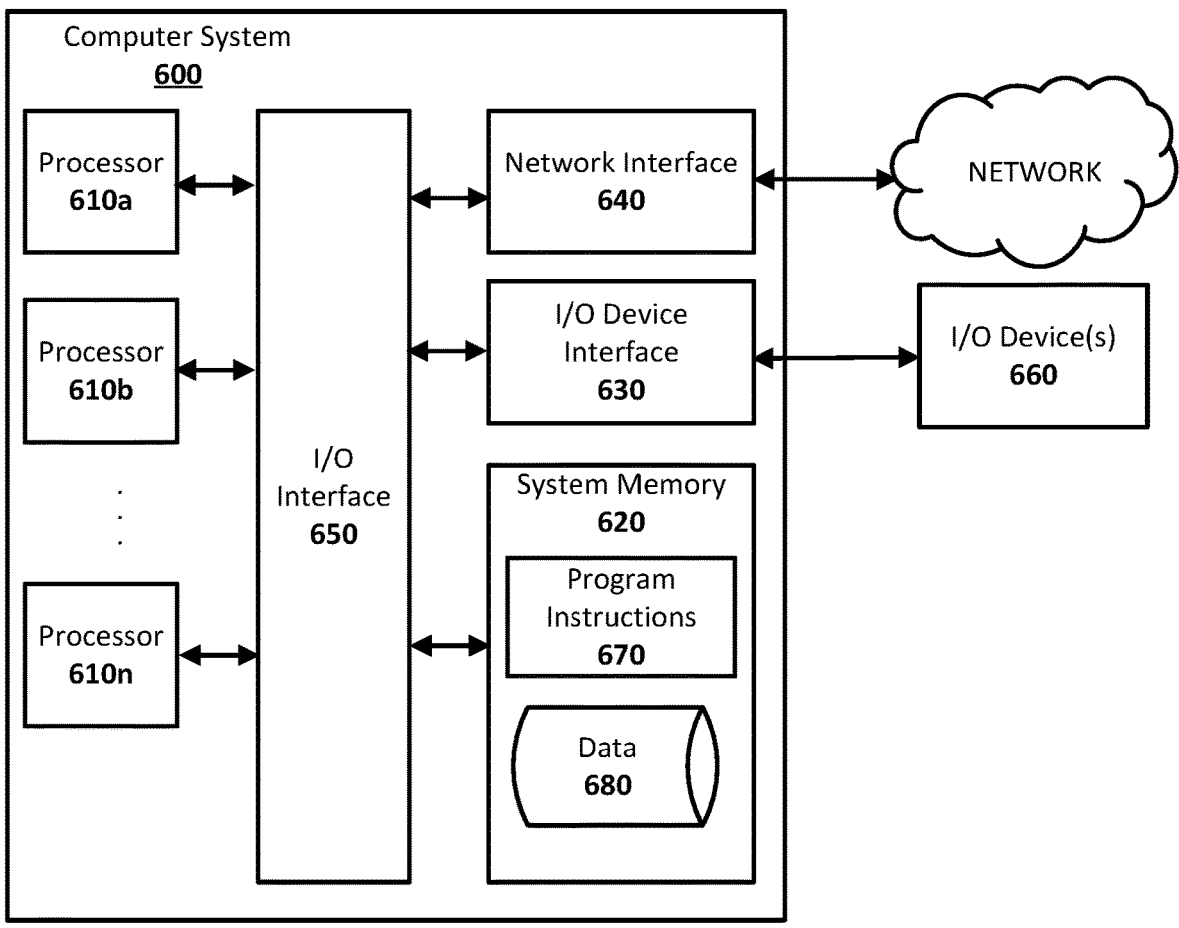
FIG. 6 shows an example computing system that may be used in accordance with some embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations or to generate, transmit, or handle all data discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., processors 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
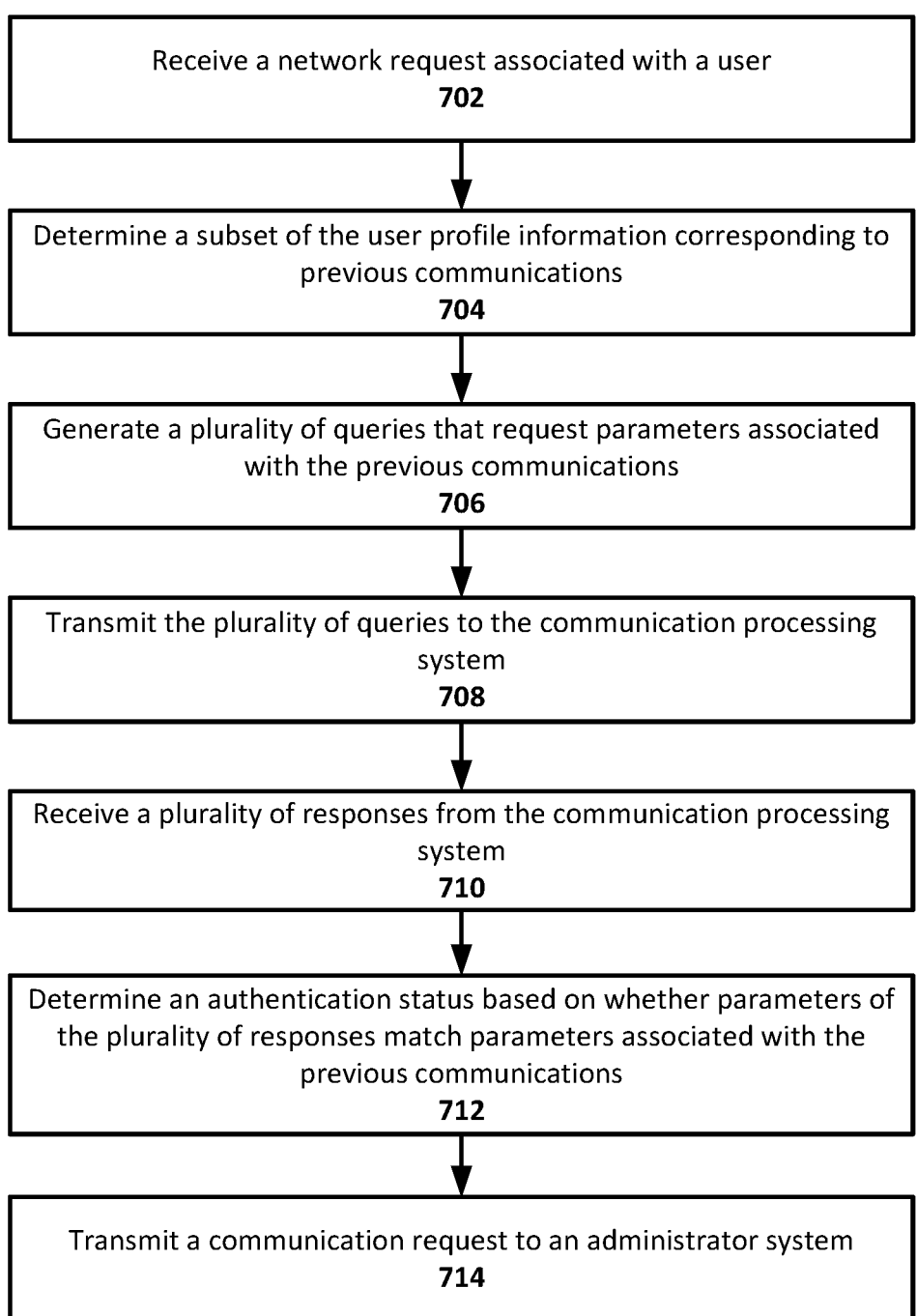
FIG. 7 shows a flowchart of basic operations involved in evaluating communication processing systems based on responses to queries based on user profile information, in accordance with one or more embodiments.

FIG. 7 shows a flowchart of basic operations involved in evaluating communication processing systems based on responses to queries based on user profile information, in accordance with one or more embodiments. For example, process 700 enables the authentication of point-of-sale systems associated with merchants based on information known to the point-of-sale system, thereby maintaining the security and privacy of transactions associated with a payment system, while enabling user authentication using publicly accessible user credentials.

At 702, process 700 (e.g., using one or more components described above) enables computer system 600 to receive a network request associated with a user. For example, computer system 600 may receive, via network interface 640 and network 150, from a communication processing system of a plurality of communication processing systems, a network request associated with a user. The network request may include communication data and user information for the user. Computer system 600 may store the communication data and user information within system memory 620, such as within data 680. As an illustrative example, computer system 600 may receive information relating to a transaction between a user and a merchant's point-of-sale system (e.g., including a transaction value and information identifying the user), thereby enabling computer system 600 to authenticate the transaction based on such data.

At 704, process 700 (e.g., using one or more components described above) enables computer system 600 to determine a subset of the user profile information corresponding to previous communications. For example, computer system 600 may determine, based on user profile information associated with the user (e.g., using program instructions 670 and processors 610a-610n), a subset of the user profile information corresponding to previous communications between the user and the communication processing system. As an illustrative example, computer system 600 may determine transactions of the user profile information that are associated with the particular user and the particular merchant associated with the point-of-sale system. By doing so, computer system 600 enables the evaluation of the point-of-sale system's authenticity by verifying the existence of information that is likely to be stored within the point-of-sale system.

At 706, process 700 (e.g., using one or more components described above) enables computer system 600 to generate a plurality of queries that request parameters associated with the previous communications. For example, computer system 600 may, using program instructions 670 and processors 610a-610n, provide the subset of the user profile information to a query generation model to generate a plurality of queries that request parameters associated with the previous communications between the user and the communication processing system. The plurality of queries may include a plurality of requests for a subset of the communication data.

At 708, process 700 (e.g., using one or more components described above) enables computer system 600 to transmit the plurality of queries to the communication processing system. For example, computer system 600, using network interface 640, may transmit the queries to the point-of-sale system. By doing so, computer system 600 enables authentication system 102 to probe the point-of-sale system for whether relevant information is stored, thereby enabling authentication of the point-of-sale system.

At 710, process 700 (e.g., using one or more components described above) enables computer system 600 to receive a plurality of responses from the communication processing system. For example, computer system 600 may receive (e.g., via network interface 640), from the communication processing system, a plurality of responses. Each response of the plurality of responses may correspond to an associated query of the plurality of queries and include a corresponding parameter. Computer system 600 may store the responses within system memory 620 (e.g., within data 680). By doing so, computer system 600 enables further evaluation of responses provided by the communication processing system (e.g., a point-of-sale system associated with a merchant) for authentication of the associated merchant device.

At 712, process 700 (e.g., using one or more components described above) enables computer system 600 to determine an authentication status based on whether parameters of the plurality of responses match parameters associated with the previous communications. For example, computer system 600 may determine (e.g., using program instructions 670 and processors 610a-610n) an authentication status based on whether parameters of the plurality of responses match parameters associated with the previous communications. As an illustrative example, authentication system 102 may compare responses from the point-of-sale system with responses within a user database (e.g., within a ledger of transactions associated with users of the payment system). By doing so, computer system 600 may determine an authentication status for the point-of-sale system based on determining whether the point-of-sale system possesses information associated with relevant transactions.

At 714, process 700 (e.g., using one or more components described above) enables computer system 600 to transmit a communication request to an administrator system. For example, based on the authentication status for the communication processing system, computer system 600 may transmit (e.g., through network interface 640 and network 150), to an administrator system, a communication request associated with the communication data. As an illustrative example, computer system 600 may transmit a request to execute a transaction associated with the network request (e.g., to execute a payment from the user to the merchant). By doing so, computer system 600 may ensure the authenticity of the merchant's point-of-sale system prior to validating the transaction associated with the network request.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving, from a communication processing system of a plurality of communication processing systems, a network request associated with a client device, wherein the network request comprises communication data and user information including identification data associated with a user of the client device; accessing user profile information corresponding to the user, wherein the user profile information comprises user communication data relating to previous communications associated with the user; determining a subset of the user profile information related to the previous communications between the user and the communication processing system; providing the subset of the user profile information to a query generation model to generate a plurality of queries that request parameters associated with the subset of the user profile information; transmitting, to the communication processing system, the plurality of queries; receiving, from the communication processing system, a plurality of responses, wherein each response of the plurality of responses corresponds to an associated query of the plurality of queries and comprises a corresponding parameter; determining a plurality of match indicators, wherein each match indicator of the plurality of match indicators specifies whether a given parameter of the plurality of responses matches a given parameter of the subset of the user profile information; based on the plurality of match indicators, determining an authentication status for the communication processing system; and based on the authentication status for the communication processing system, transmitting, to an administrator system, a communication request associated with the communication data.

2. A method, the method comprising receiving, from a communication processing system of a plurality of communication processing systems, a network request associated with a user, wherein the network request comprises communication data and user information for the user; determining, based on user profile information associated with the user, a subset of the user profile information corresponding to previous communications between the user and the communication processing system; providing the subset of the user profile information to a query generation model to generate a plurality of queries that request parameters associated with the previous communications between the user and the communication processing system, wherein the plurality of queries comprises a plurality of requests for a subset of the communication data; transmitting, to the communication processing system, the plurality of queries; receiving, from the communication processing system, a plurality of responses, wherein each response of the plurality of responses corresponds to an associated query of the plurality of queries and comprises a corresponding parameter; determining an authentication status based on whether parameters of the plurality of responses match parameters associated with the previous communications; and based on the authentication status for the communication processing system, transmitting, to an administrator system, a communication request associated with the communication data.

3. A method, the method comprising receiving, from a communication processing system of a plurality of communication processing systems, a network request associated with a user device, wherein the network request comprises communication data and user information for a user of the user device; determining, based on user profile information associated with the user, a subset of the user profile information corresponding to previous communications associated with the communication processing system; providing the subset of the user profile information to a query generation model to generate a plurality of queries that request parameters associated with the previous communications, wherein the plurality of queries comprises a plurality of requests for a subset of the communication data; transmitting, to the communication processing system, the plurality of queries; receiving, from the communication processing system, a plurality of responses, wherein each response of the plurality of responses corresponds to an associated query of the plurality of queries and comprises a corresponding parameter; determining an authentication status based on whether parameters of the plurality of responses match parameters associated with the previous communications; and based on the authentication status for the communication processing system, transmitting, to an administrator system, a communication request associated with the communication data.

4. The method of any one of the preceding embodiments, wherein determining the subset of the user profile information comprises determining, based on the communication data, a resource indicator associated with the network request and a system identifier of the communication processing system; determining, from a communication database, a plurality of communications associated with the resource indicator and the system identifier; and generating the subset of the user profile information to include the plurality of communications.

5. The method of any one of the preceding embodiments, wherein the query generation model, when generating the plurality of queries, executes operations comprising: determining a set of parameters associated with the resource indicator; generating a first query requesting a parameter of the set of parameters; and generating the plurality of queries comprising the first query.

6. The method of any one of the preceding embodiments, wherein determining the subset of the user profile information comprises: determining, based on the communication data, a user identifier associated with the user and a system identifier of the communication processing system; determining, from a communication database, a plurality of communications associated with the user identifier and the system identifier; and generating the subset of the user profile information to include the plurality of communications.

7. The method of any one of the preceding embodiments, wherein the query generation model, when generating the plurality of queries, executes operations comprising: determining a set of parameters associated with the user identifier; generating a first query requesting a parameter of the set of parameters; and generating the plurality of queries comprising the first query.

8. The method of any one of the preceding embodiments, wherein determining the authentication status for the communication processing system comprises: determining a plurality of match indicators, wherein each match indicator of the plurality of match indicators specifies whether a given parameter of the plurality of responses matches a given parameter of the subset of the user profile information; determining a score associated with the plurality of match indicators, wherein the score indicates a proportion, of the plurality of match indicators, that indicate a match between the parameters of the plurality of responses and the parameters associated with the previous communications; comparing the score with a threshold; and based on determining that the score is greater than the threshold, determining the authentication status for the communication processing system, wherein the authentication status indicates that the score is greater than the threshold.

9. The method of any one of the preceding embodiments, further comprising: transmitting, to a device associated with the user, a request for security information associated with the communication processing system, wherein the security information includes information relating to user trust for the communication processing system; receiving, from the device, an indication of a security level for the communication processing system; and generating the threshold according to the indication of the security level.

10. The method of any one of the preceding embodiments, further comprising: determining that the score is less than the threshold; and based on determining that the score is less than a second threshold, determining the authentication status for the communication processing system, wherein the authentication status indicates that the score is less than the threshold.

11. The method of any one of the preceding embodiments, further comprising: based on determining that the score is less than the threshold, providing the user profile information to the query generation model to generate a second plurality of queries that request additional parameters associated with the previous communications; transmitting, to the communication processing system, the second plurality of queries; receiving, from the communication processing system, a second plurality of responses; based on the second plurality of responses, determining a second authentication status for the communication processing system; and based on the second authentication status, transmitting, to the administrator system, the communication request associated with the communication data.

12. The method of any one of the preceding embodiments, further comprising: determining, based on a user database, a public key associated with the user; transmitting, to a device associated with the user, a user authentication request, wherein the user authentication request includes an encrypted token, wherein the encrypted token includes data encrypted using the public key associated with the user; receiving, from the device, authentication data; comparing the authentication data with the data encrypted using the public key; based on determining that the authentication data matches the data encrypted using the public key, generating a user authentication status for the user; and based on the authentication status for the communication processing system and the user authentication status, transmitting the communication request associated with the communication data.

13. The method of any one of the preceding embodiments, further comprising: receiving training data, wherein the training data includes training user information and training queries; and providing the training data to the query generation model to train the query generation model to generate output queries based on input user information.

14. The method of any one of the preceding embodiments, wherein training the query generation model to generate the output queries based on the input user information comprises: providing the training data to the query generation model comprising an artificial neural network, wherein the artificial neural network comprises model parameters associated with hidden layers of the artificial neural network; and updating the model parameters based on the training data.

15. The method of any one of the preceding embodiments, wherein generating the plurality of queries comprises: determining a set of parameter indicators and associated parameter data associated with the user profile information; and generating the plurality of queries including requests for parameter data associated with parameter indicators of the set of parameter indicators.

16. The method of any one of the preceding embodiments, further comprising: retrieving, from a user database, a plurality of communication records; determining a plurality of parameter sets, wherein each parameter set of the plurality of parameter sets is associated with a given communication record of the plurality of communication records, and wherein the given communication record is associated with a given historical communication between the user and a given communication processing system of the plurality of communication processing systems; and generating the user profile information comprising the plurality of parameter sets.

17. The method of any one of the preceding embodiments, further comprising: transmitting, to a device associated with the user, a first query of the plurality of queries; receiving, from the device, a user response; comparing the user response with a corresponding response of the plurality of responses, wherein the corresponding response is associated with the first query; determining that the user response matches the corresponding response; and based on determining that the user response matches the corresponding response, transmitting, to the administrator system, the communication request.

18. One or more tangible, non-transitory, computer-readable media storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

What is claimed is:

1. A system for authenticating communication processing systems, the system comprising:

one or more processors; and one or more non-transitory, computer-readable media storing instructions that, when executed by the one or more processors, cause operations comprising:

receiving, from a communication processing system of a plurality of communication processing systems, a network request associated with a client device, wherein the network request comprises communication data and user information including identification data associated with a user of the client device;

accessing user profile information corresponding to the user, wherein the user profile information comprises user communication data relating to previous communications associated with the user;

determining a subset of the user profile information related to the previous communications between the user and the communication processing system;

providing the subset of the user profile information to a query generation model to generate a plurality of queries that request parameters associated with the subset of the user profile information;

transmitting, to the communication processing system, the plurality of queries;

receiving, from the communication processing system, a plurality of responses, wherein each response of the plurality of responses corresponds to an associated query of the plurality of queries and comprises a corresponding parameter;

determining a plurality of match indicators, wherein each match indicator of the plurality of match indicators specifies whether a given parameter of the plurality of responses matches a given parameter of the subset of the user profile information;

based on the plurality of match indicators, determining an authentication status for the communication processing system; and based on the authentication status for the communication processing system, transmitting, to an administrator system, a communication request associated with the communication data.

2. A method comprising:

receiving, from a communication processing system of a plurality of communication processing systems, a network request associated with a user, wherein the network request comprises communication data and user information for the user;

determining, based on user profile information associated with the user, a subset of the user profile information corresponding to previous communications between the user and the communication processing system;

providing the subset of the user profile information to a query generation model to generate a plurality of queries that request parameters associated with the previous communications between the user and the communication processing system, wherein the plurality of queries comprises a plurality of requests for a subset of the communication data;

transmitting, to the communication processing system, the plurality of queries;

receiving, from the communication processing system, a plurality of responses, wherein each response of the plurality of responses corresponds to an associated query of the plurality of queries and comprises a corresponding parameter;

determining an authentication status based on whether parameters of the plurality of responses match parameters associated with the previous communications; and based on the authentication status for the communication processing system, transmitting, to an administrator system, a communication request associated with the communication data.

3. The method of claim 2, wherein determining the subset of the user profile information comprises:

determining, based on the communication data, a resource indicator associated with the network request and a system identifier of the communication processing system;

determining, from a communication database, a plurality of communications associated with the resource indicator and the system identifier; and generating the subset of the user profile information to include the plurality of communications.

4. The method of claim 3, wherein the query generation model, when generating the plurality of queries, executes operations comprising:

determining a set of parameters associated with the resource indicator;

generating a first query requesting a parameter of the set of parameters; and generating the plurality of queries comprising the first query.

5. The method of claim 2, wherein determining the subset of the user profile information comprises:

determining, based on the communication data, a user identifier associated with the user and a system identifier of the communication processing system;

determining, from a communication database, a plurality of communications associated with the user identifier and the system identifier; and generating the subset of the user profile information to include the plurality of communications.

6. The method of claim 5, wherein the query generation model, when generating the plurality of queries, executes operations comprising:

determining a set of parameters associated with the user identifier;

generating a first query requesting a parameter of the set of parameters; and generating the plurality of queries comprising the first query.

7. The method of claim 2, wherein determining the authentication status for the communication processing system comprises:

determining a plurality of match indicators, wherein each match indicator of the plurality of match indicators specifies whether a given parameter of the plurality of responses matches a given parameter of the subset of the user profile information;

determining a score associated with the plurality of match indicators, wherein the score indicates a proportion, of the plurality of match indicators, that indicate a match between the parameters of the plurality of responses and the parameters associated with the previous communications;

comparing the score with a threshold; and based on determining that the score is greater than the threshold, determining the authentication status for the communication processing system, wherein the authentication status indicates that the score is greater than the threshold.

8. The method of claim 7, further comprising:

transmitting, to a device associated with the user, a request for security information associated with the communication processing system, wherein the security information includes information relating to user trust for the communication processing system;

receiving, from the device, an indication of a security level for the communication processing system; and generating the threshold according to the indication of the security level.

9. The method of claim 7, further comprising:

determining that the score is less than the threshold; and based on determining that the score is less than a second threshold, determining the authentication status for the communication processing system, wherein the authentication status indicates that the score is less than the threshold.

10. The method of claim 9, further comprising:

based on determining that the score is less than the threshold, providing the user profile information to the query generation model to generate a second plurality of queries that request additional parameters associated with the previous communications;

transmitting, to the communication processing system, the second plurality of queries;

receiving, from the communication processing system, a second plurality of responses;

based on the second plurality of responses, determining a second authentication status for the communication processing system; and based on the second authentication status, transmitting, to the administrator system, the communication request associated with the communication data.

11. The method of claim 2, further comprising:

determining, based on a user database, a public key associated with the user;

transmitting, to a device associated with the user, a user authentication request, wherein the user authentication request includes an encrypted token, wherein the encrypted token includes data encrypted using the public key associated with the user;

receiving, from the device, authentication data;

comparing the authentication data with the data encrypted using the public key;

based on determining that the authentication data matches the data encrypted using the public key, generating a user authentication status for the user; and based on the authentication status for the communication processing system and the user authentication status, transmitting the communication request associated with the communication data.

12. The method of claim 2, further comprising:

receiving training data, wherein the training data includes training user information and training queries; and providing the training data to the query generation model to train the query generation model to generate output queries based on input user information.

13. The method of claim 12, wherein training the query generation model to generate the output queries based on the input user information comprises:

providing the training data to the query generation model comprising an artificial neural network, wherein the artificial neural network comprises model parameters associated with hidden layers of the artificial neural network; and updating the model parameters based on the training data.

14. The method of claim 2, wherein generating the plurality of queries comprises:

determining a set of parameter indicators and associated parameter data associated with the user profile information; and generating the plurality of queries including requests for parameter data associated with parameter indicators of the set of parameter indicators.

15. The method of claim 2, further comprising:

retrieving, from a user database, a plurality of communication records;

determining a plurality of parameter sets, wherein each parameter set of the plurality of parameter sets is associated with a given communication record of the plurality of communication records, and wherein the given communication record is associated with a given historical communication between the user and a given communication processing system of the plurality of communication processing systems; and generating the user profile information comprising the plurality of parameter sets.

16. The method of claim 2, further comprising:

transmitting, to a device associated with the user, a first query of the plurality of queries;

receiving, from the device, a user response;

comparing the user response with a corresponding response of the plurality of responses, wherein the corresponding response is associated with the first query;

determining that the user response matches the corresponding response; and based on determining that the user response matches the corresponding response, transmitting, to the administrator system, the communication request.

17. One or more non-transitory, computer-readable media storing instructions that, when executed by one or more processors, cause operations comprising:

receiving, from a communication processing system of a plurality of communication processing systems, a network request associated with a user device, wherein the network request comprises communication data and user information for a user of the user device;

determining, based on user profile information associated with the user, a subset of the user profile information corresponding to previous communications associated with the communication processing system;

providing the subset of the user profile information to a query generation model to generate a plurality of queries that request parameters associated with the previous communications, wherein the plurality of queries comprises a plurality of requests for a subset of the communication data;

transmitting, to the communication processing system, the plurality of queries;

receiving, from the communication processing system, a plurality of responses, wherein each response of the plurality of responses corresponds to an associated query of the plurality of queries and comprises a corresponding parameter;

determining an authentication status based on whether parameters of the plurality of responses match parameters associated with the previous communications; and based on the authentication status for the communication processing system, transmitting, to an administrator system, a communication request associated with the communication data.

18. The one or more non-transitory, computer-readable media of claim 17, wherein the instructions for determining the subset of the user profile information cause operations comprising:

determining, based on the communication data, a resource indicator associated with the network request and a system identifier of the communication processing system;

determining, from a communication database, a plurality of communications associated with the resource indicator and the system identifier; and generating the subset of the user profile information to include the plurality of communications.

19. The one or more non-transitory, computer-readable media of claim 18, wherein the instructions for generating the plurality of queries cause operations comprising:

determining a set of parameters associated with the resource indicator;

generating a first query requesting a parameter of the set of parameters; and generating the plurality of queries comprising the first query.

20. The one or more non-transitory, computer-readable media of claim 17, wherein the instructions for determining the subset of the user profile information cause operations comprising:

determining, based on the communication data, a user identifier associated with the user and a system identifier of the communication processing system;

determining, from a communication database, a plurality of communications associated with the user identifier and the system identifier; and generating the subset of the user profile information to include the plurality of communications.

\* \* \* \* \*